(12) United States Patent  
Hameen-Anttila

(10) Patent No.: US 7,037,198 B2  
(45) Date of Patent: May 2, 2006

(54) RECORDING GAME INFORMATION INTO A SERVER

(75) Inventor: Tapio Hameen-Anttila, Helsinki (FI)

(73) Assignee: Nokia Corporation, Espoo (FI)

( * ) Notice: Subject to any disclaimer, the term of this patent is extended or adjusted under 35 U.S.C. 154(b) by 298 days.

(21) Appl. No.: 09/455,956

(22) Filed: Dec. 7, 1999

(65) Prior Publication Data

US 2002/0049507 A1 Apr. 25, 2002

(51) Int. Cl.
*A63F 9/24* (2006.01)

(52) U.S. Cl. ............ 463/41; 700/92; 379/201.07; 340/323 R

(58) Field of Classification Search ............ 700/90–92; 463/40–42
See application file for complete search history.

(56) References Cited

U.S. PATENT DOCUMENTS

| 5,283,733 | A |   | 2/1994  | Colley ................ 364/411 |
| 5,319,548 | A |   | 6/1994  | Germain .............. 364/410 |
| 5,412,188 | A |   | 5/1995  | Metz .................. 235/375 |
| 5,434,789 | A |   | 7/1995  | Fraker et al. ........ 364/460 |
| 5,544,321 | A |   | 8/1996  | Theimer et al. ..... 395/200.11 |
| 5,557,717 | A | * | 9/1996  | Wayner ............... 700/92 |
| 5,649,289 | A | * | 7/1997  | Wang et al. .......... 455/31.3 |
| 5,681,108 | A |   | 10/1997 | Miller ................ 364/411 |
| 5,727,057 | A | * | 3/1998  | Emery et al. ........ 379/201.07 |
| 5,772,534 | A |   | 6/1998  | Dudley ............... 473/407 |
| 5,779,566 | A |   | 7/1998  | Wilens ............... 473/407 |
| 5,795,237 | A |   | 8/1998  | Miyamoto ............ 473/131 |
| 5,809,415 | A |   | 9/1998  | Rossmann ............ 455/422 |
| 5,810,680 | A | * | 9/1998  | Lobb et al. .......... 473/407 |
| 5,878,369 | A |   | 3/1999  | Rudow et al. ........ 701/215 |
| 5,949,679 | A |   | 9/1999  | Born et al. .......... 364/410.1 |
| 5,999,808 | A | * | 12/1999 | LaDue ................ 455/412 |
| 6,014,090 | A | * | 1/2000  | Rosen et al. ........ 340/905 |
| 6,062,991 | A | * | 5/2000  | Moriarty et al. ..... 473/407 |
| 6,117,013 | A | * | 9/2000  | Eiba ................. 463/41 |
| 6,122,559 | A | * | 9/2000  | Bohn ................. 700/91 |

FOREIGN PATENT DOCUMENTS

| EP | 0 674 924 A1 |   | 10/1995 |
| EP | 0 820 183 A2 |   | 1/1998  |
| GB | 2 249 202    |   | 4/1992  |
| GB | 2249202 A    | * | 4/1992  |
| JP | 07141401     |   | 2/1995  |
| JP | 11-206944    |   | 8/1999  |
| JP | 11-206945    |   | 8/1999  |
| WO | WO 98/44998  |   | 10/1998 |
| WO | WO 99/37369  |   | 7/1999  |
| WO | WO 99/47216  |   | 9/1999  |
| WO | WO 00/76599 A1 |  | 12/2000 |

\* cited by examiner

*Primary Examiner*—Joe H. Cheng  
(74) *Attorney, Agent, or Firm*—Cohen, Pontani, Lieberman & Pavane

(57) ABSTRACT

A sport server includes a sport database for storing sport data. The sport server communicates with a variety of input devices for receiving the sport data. The sport server determines the type of input device and then communicates with the input device using appropriate display and communication parameters. The sport server then outputs the sport data to various output devices using appropriate parameters for each output device.

42 Claims, 4 Drawing Sheets

RECORDING GAME INFORMATION INTO A SERVER

BACKGROUND OF THE INVENTION

1. Field of the Invention

The present invention relates to a server for managing a database for storing statistics for players and teams of various types of sports.

2. Description of the Related Art

There are many prior art references which include memory for keeping statistics on the players of sports such, for example, as U.S. Pat. No. 5,412,188 which discloses a sports statistic recording system for basketball. In accordance with that patent, charts containing barcodes are read by a scanning device connected to a personal computer. Records are made during the game for each event that occurs during the game. An operator scans the bar code associated with the player, the event type, and the time the event occurred during the game.

U.S. Pat. No. 5,795,237 discloses a portable electronic golf score display device. This device includes a ROM memory for executing the program and a RAM memory for the course information and the score information. The information recorded on the portable device may be downloaded to a computer for adding up and displaying of data.

U.S. Pat. No. 5,878,369 discloses a golf course yardage and information system. This system includes a mobile unit subsystem which can be mounted on a golf cart or held by a golfer which includes Differential Global Positioning Satellite (DGPS) technology so that its position on the golf course can be determined. Furthermore, the individual strikes of each golfer can be recorded and transmitted to a central course management station. The information of each mobile station is compiled at the course management station and used to determine bottlenecks on the course and other statistical information.

U.S. Pat. No. 5,319,548 discloses an interactive golf game information system that receives, stores, analyzes and outputs a plurality of different types of information. The system generates a golf play recording card on which a player records a single character for each stroke. Each character represents a club and a location. After finishing a hole, the card is inserted into a reader which analyzes and stores the information. The system can then analyze performance based on the recorded information.

U.S. Pat. No. 5,779,566 discloses a hand-held golf reporting and statistical analysis apparatus. Prior to game play, the device provide information to allow the player to make informed performance-effecting positions such as the best time of day to play, the best golf ball compression to use, or the most ideal ground conditions, for example. During game play, the device provides means to record the player performance and to assist a player in selecting the most appropriate golf club for each shot, considering the player's club skill and the effect of extrinsic factors. After game play, the device provides a comprehensive set of historical data on performance, including the effects of extrinsic data on performance.

U.S. Pat. No. 5,772,534 discloses a satellite enhanced golf information system. This system uses a golf cart fitted with a differential global positioning satellite (DGPS) system to determine how far a golfer is from a pin based on a position of the golf cart and also to indicate to a base system of the golf course the progression of each particular golf course along the course.

U.S. Pat. No. 5,681,108 discloses a golf scorekeeping system including a portable handheld data processing system that stores and retrieves golf information using a voice recognition system.

PCT Publication No. WO 98/44998 discloses a golf records keeping system. The system includes a central processing unit (CPU), a card reader and a printer. The card reader receives player identification and sends it to the CPU. The CPU processes the data and prints a personalized score card for the player. During play, the player marks the scorecard by indicating the number of strokes taken for each hole. After play is completed, the player sends his completed scorecard through the reader and verifies that the information read by the reader is correct. After verification, the data is sent to a central database and the new information is added to previously accumulated information for that player to re-handicap the player if required.

Japanese Patent Publication No. 07-141401 discloses a method of gathering measurement data in a database server by plural measuring devices. A database server stores and manages the measurement data outputted from the plural measuring devices.

SUMMARY OF THE INVENTION

It is an object of the invention to provide a server that records game information received from many different types of input devices into a database and presents the stored information to viewers via many different types of output devices.

It is a further object of the invention to provide a server that records game information and performs further operations on the recorded information to describe calculated and/or personalized results.

A sports server according to the present invention includes a server including at least one sport database for recording statistics for one or more sports. According to the present invention, a game result is generated by playing a game such as, for example, golf, ice hockey, football, baseball, and bowling. The game results are input into a mobile terminal input device and then transmitted via the mobile terminal to a central location, i.e., the sport server. The game results may be input by the player himself or may be automatically added to the game server based on results received from a detecting system such as, for example, an automatic scoring device in a bowling alley which detects pins left standing and after each turn and records the result. Alternatively, the game results may be input by a person assigned to input the results of a specific sporting event. The mobile terminal transmits the result to the sport server including the location of the mobile terminal. The server then determines the database field in which to input the information based on the user input and optionally on the location information and records the information in that database field. The recorded information may then be presented to any user with access to the database.

As a specific example, a golf player may play a hole and input his score, i.e., the number of strokes, into the mobile terminal. The sport server recognizes the type of mobile terminal being used and prompts the mobile terminal for the game score information using a display that is appropriate for the type of mobile terminal being used to input the information. The mobile terminal then transmits the information via a mobile communications network to the sport server including the location from which the mobile terminal is sending the information. The location information is determined by a communication system, a GPS system, or a base station to which the mobile terminal communicates. Based on the location information, the sport server determines which golf course the player is playing and saves the information appropriately in the database associated with that golf course. The player may send all his information at once in the first contact to the server, e.g., name, golf course, etc., which does not need to be sent sequentially. The result for each hole may be sent after each hole is played. The user may be identified by, for example, his subscriber ID. Accordingly, after the first connection to the server, the user is identifiable by his subscriber ID and does not need to re-enter such information each time the user enters the score for a hole. In addition to the score for each hole, the information that can be inputted may further include information about long drives, chips, putting, and sand drives. The information may then be analyzed by the sport server to determine the player's strengths and weaknesses. The sport server may also determine how well all players perform on a certain course. The player can access his own previous results and scores and compare his current status to these earlier achievements. Furthermore, the results of a tournament on a golf course may be accessed by querying the database for all games played on the day of the tournament and on the course on which the tournament was held.

Various types of input devices may be used to input the information to the server. Likewise, the information in the database may be accessed by various different types of output devices.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
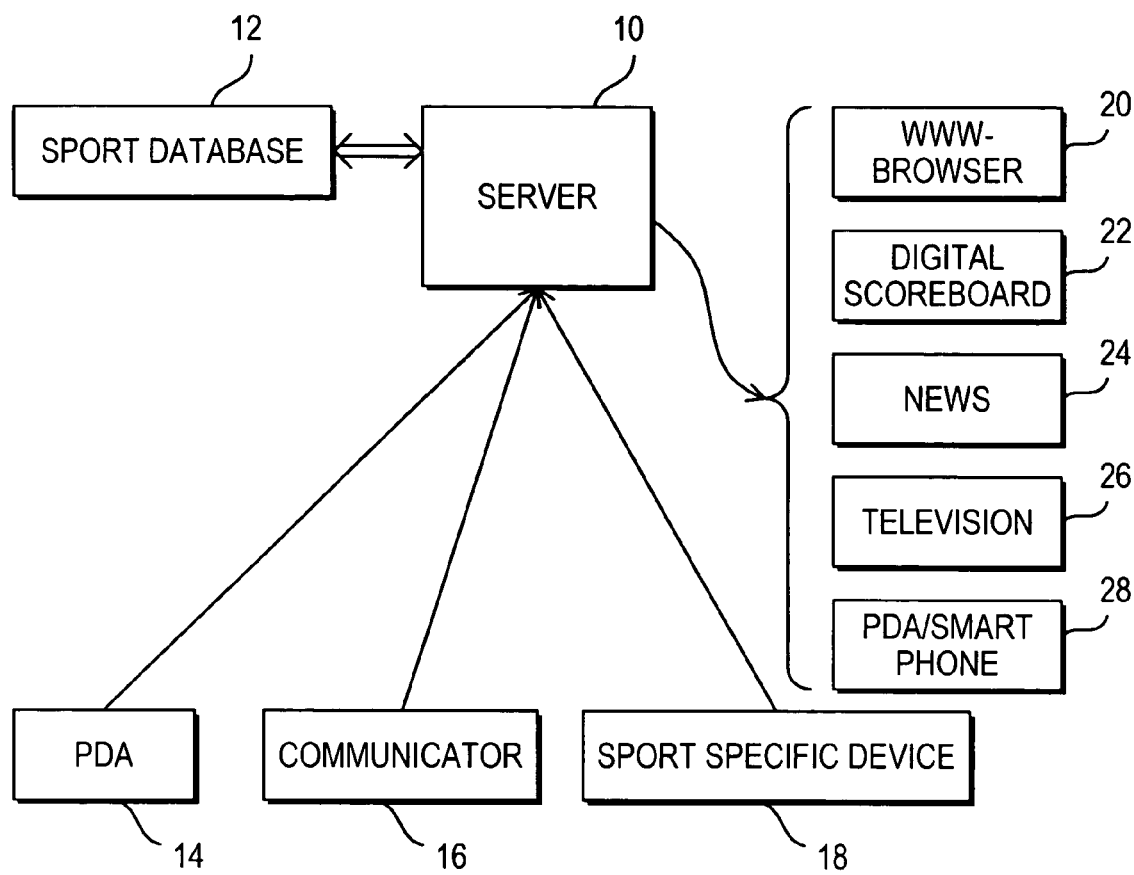
FIG. 1 is a flow diagram showing the steps required for entering data to the sport server.

FIG. 1 shows a sport server 10 with a sport database 12 according to an embodiment of the present invention. The sport server 10 is a server including a computer for managing sport data to be saved in the sport database 12 and for managing queries of the sport database by users having access to the sport data. The sport server 10 may comprise various types of software for communicating with various types of input and output devices and may, for example, comprise a world wide web server for communicating via the internet and the world wide web, a Wireless Application Protocol (WAP) for communicating with WAP capable terminals, and sport specific software for communicating with sport specific devices designed specifically for inputting game results of a specific sport. The results of a sporting event, such as a game, competition, or tournament are input to the sport database 12 by a user using an input device, i.e., a mobile terminal. After being input, the results are viewable on output devices. Accordingly, there are two different types of users of the sport server 10. The first type of users are data entrants who input the results of a sporting event into the sport database 12. The second type of users are viewers who view the data in the sport database 12 using output devices.

The sport server 10 is designed to receive input from various types of input devices such, for example, as a Personal Digital Assistant (PDA) 14, a WAP capable communicator 16, and a sport specific device 18. The WAP capable communicator 16 typically comprises a handheld wireless device such as a mobile phone, a pager, a two-way radio, or a smart-phone.

The output device may comprise a www-browser 20, an electric scoreboard 22, a news wire 24, a television 26, or a PDA/SmartPhone/cell phone 28. The data transmitted to the output device may be the raw data input by the input device or the sport server may compile a report from the history of data stored in the sport database 12. For example, the sport server may analyze data for a particular player to determine strengths and weaknesses of the player.

Figure 2:
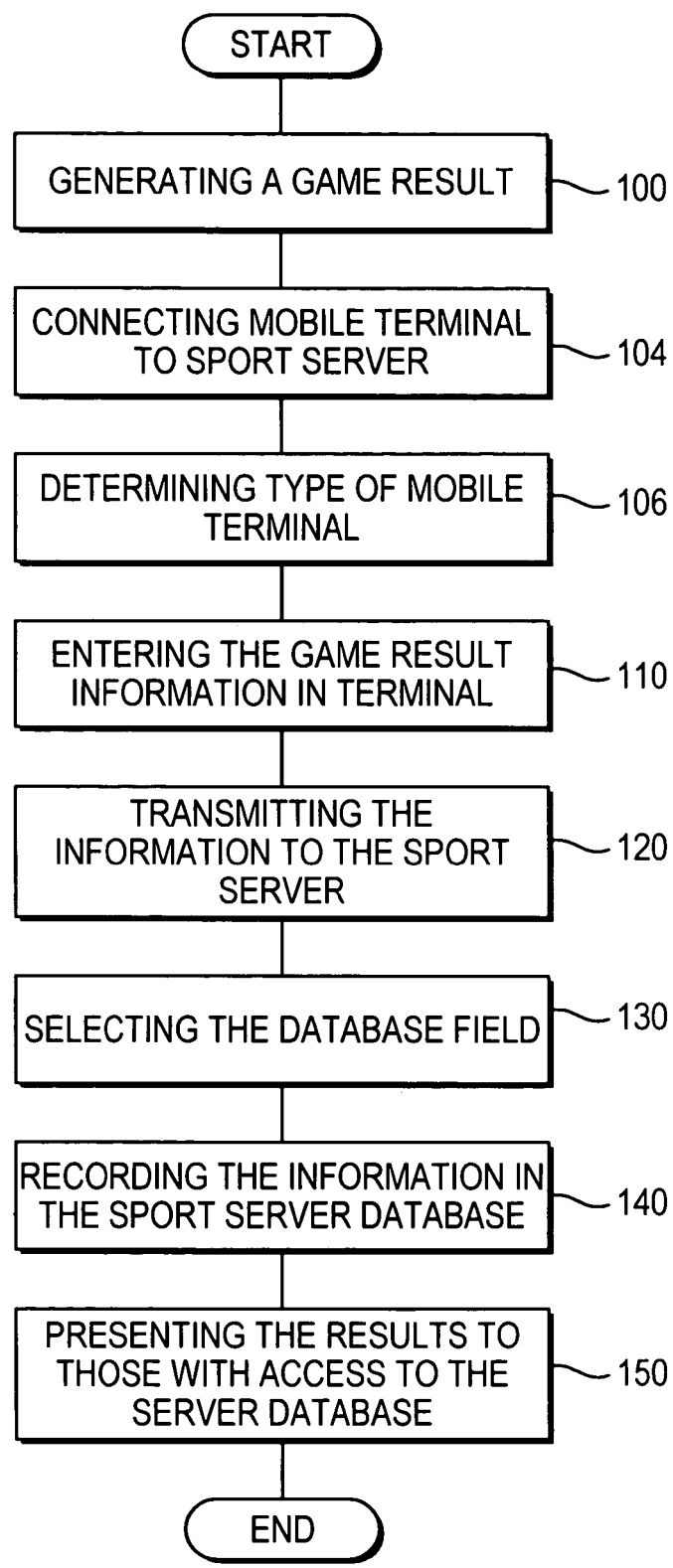
FIG. 2 is a block diagram showing the sport server and database and various input devices and output devices used to record and view the game information.

The general procedure according to the invention is depicted in FIG. 2. A game result is generated by players of a sporting event such as a round of golf, step 100. To input the sport data, i.e., the game result in a sport database, a mobile terminal is connected to a sport server, step 104. The sport server then determines the type of mobile terminal being used and prompts the mobile terminal for the sport data using a prompt display that is appropriate for the mobile terminal type, step 106. For example, the display of a conventional mobile telephone can display a certain number of characters of a specific size and is not in color. Therefore, the prompt display to the mobile phone will conform to the parameters of the display of that phone. Alternatively, the input device may also comprise a PDA having a larger display which may be in color. In this case, the output of the server is formatted for the larger display and is in color. Accordingly, the prompt display and the communication protocol must conform to the particular input device and output device. Once the prompt display is transmitted, the sport data are then input into a mobile terminal by a user, step 110. The mobile terminal then transmits the sport data to the sport server including location information for the mobile terminal, step 120. The sport server then selects the appropriate field in the sport database based on the sport data received from the mobile terminal, step 130. In an optional embodiment, the location information is used by the sports server to help determine the appropriate field in the sport database. The information is then recorded in the appropriate database, step 140, and the sport data may then be accessed by those having proper authority to do so, step 150.

Figure 3:
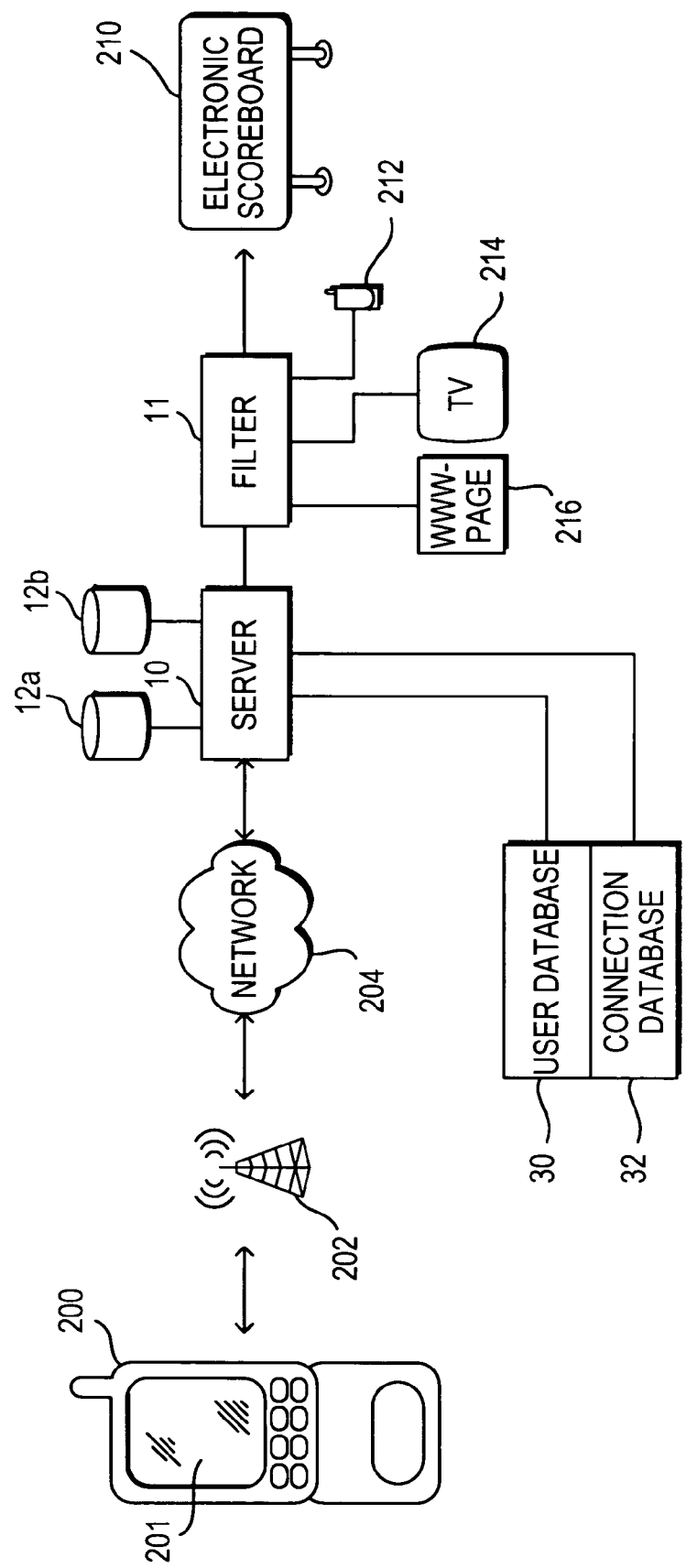
FIG. 3 is a schematic diagram showing the transmission of an input signal to the sport server and the transmission of an output signal from the sport server to an output device.

FIG. 3 depicts a mobile phone 200 being used as an input device. The mobile phone 200 is connected to the sport server 10 via a base station 202 connected to a network 204 which is connected to the sport server 10. As shown in FIG. 3, two sport databases 12a, 12b may be connected with the sport server 10, each storing sport data for a different sport and/or a different region. During establishment of the connection, the sport server 10 determines the type of mobile terminal being used and the parameters required for communication with that mobile terminal, i.e., step 106 in FIG. 2. The connection database includes the type of device, the horizontal and vertical resolution of the display on the device, the colors of the display, the operating system used by the display, the operating system of the device (i.e., Nokia Communicator 9110, Palm V, Windows CE), the connection speed, the processor power, the amount of memory, and a key for accessing the sport database. Furthermore, the sport server may require validation of the user before sport data can be input to or retrieved from the sport database 12. The validation may require a password, or may validate the user by phone number or device ID. Accordingly, the sport server must include a connection database 32 including input device information and a user database 30 including information for all valid users.

Figure 4A:
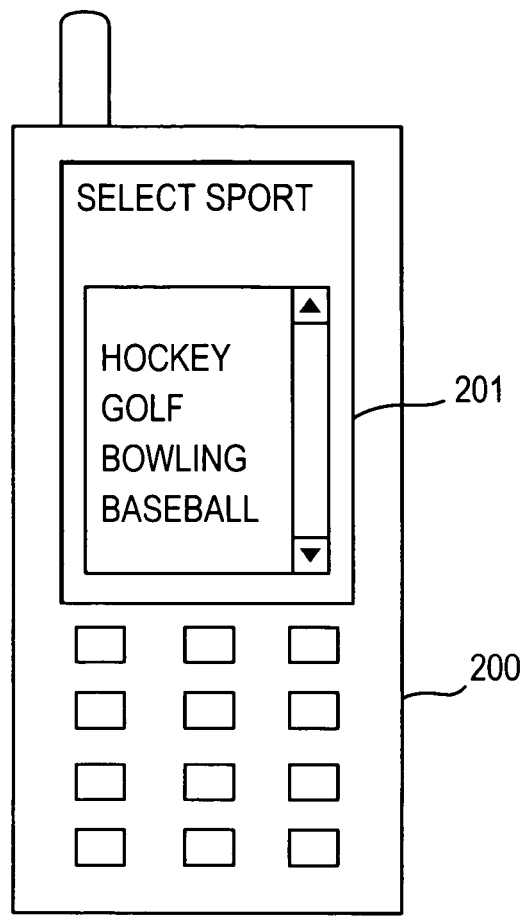
FIGS. 4a and 4b respectively show the display of an input device with a first prompt for selecting a specific sport and a second prompt showing a sport specific input screen for inputting information pertaining to the selected sport.
Figure 4B:
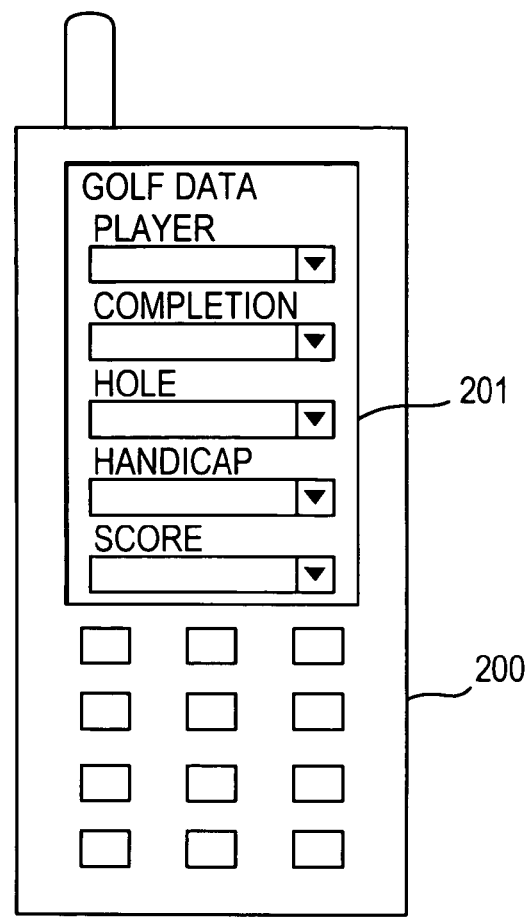

Once the connection is established and the user is validated, the sport server 10 prompts the user for sport data via the display 201. For example, FIG. 4*a* shows a first prompt on display 201 which lists various sports and requests that the user choose the sport for which data is to be input or retrieved. If, for example, golf is selected, a second prompt will appear on the display 201 as shown in FIG. 4*b* and may prompt the user for golf specific data such as course name, hole, score, player ID, and player handicap. For team sports, such as baseball, the display may prompt the user for which teams are playing, the score, the stadium, and the inning or period of the latest update.

The sport database 12 preferably comprises data written using eXtensible Markup Language (XML), which is a pared down version of the Standard Generalized Markup Language (SGML). However, SGML may also be used. The sport server 10 includes software supporting a www-server, WAP-server and Sport Server.

Once the sport data is saved in the sport database 12 (or databases 12*a*, 12*b*), the sport data may be transmitted to one or more output devices. The output devices may comprise continuously connected devices that automatically display the most current information. Such output devices may comprise an electric scoreboard 22, a news wire 24, or a television 26. In these type of output devices, the sport server 10 may transmit scores for all games being played or that have been played on a present day. Alternatively, the output device may transmit only those scores for a particular sport or may transmit only the scores as they are updated. Alternatively, the output device may comprise a selectively connectable device such as a www-browser 20 or a PDA/SmartPhone/cell phone 28. Furthermore, a viewer may input commands for compiling historic data and generating reports such, for example, as for determining strengths and weaknesses of a golf player or statistics regarding records of a baseball team. A filter adapting device 11 is connected between the output devices and the sport server for adapting the sport data to the desired format for each individual output device. That is, the sport data transmitted to the user is appropriate for the type of output terminal used. Accordingly, only the portion of the output data that is required by a user or that is permitted to be sent to a user passes through the filters. For example, if a player is at home using a PC with a screen, the game server will send audio and video information to the user. However, if the user is using a PDA, or some other communicator without a screen or speakers, the game server may send only SMS data indicating the results of game play in text messages.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale. It is the intention, therefore, to be limited only as indicated by the scope of the claims appended hereto.

What is claimed is:

1. A method of transmitting sport data, said method comprising the steps of:
   (a) establishing a communication connection between a mobile terminal and the a sport server using a public cellular communications network so that the mobile terminal is in communication with the sport server;
   (b) determining, by the sport server, a type of mobile terminal used and at least display parameters of the mobile terminal and selecting a prompt display to be communicated to the mobile terminal based on the determined display parameters of the mobile terminal;
   (c) setting the mobile terminal in a sport data input mode in response to receiving the prompt display and selecting a selected sport to which sport data to be inputted pertains;
   (d) inputting the sport data into the mobile terminal in communication with the sport server;
   (e) directly transmitting the inputted sport data from the mobile terminal to the sport server as the sports data is input by the user in said step (d);
   (f) recording, by the sports server, the sport data in a sport database; and
   (g) transmitting the sport data from the sport server to an output device which has requested the sport data and adapting, by a filter adapting device, the sport data to a desired format for the output device.

2. The method of claim 1, further comprising the step of determining, by the sport server, a geographical location of the mobile terminal in communication with the sport server and determining a field in which to enter the sport data in the sport database in response to the geographical location determined by said sport server before said step (f) and wherein said step (f) further comprises recording the sport data in the field in the sport database determined by said sport server.

3. The method of claim 2, wherein said step (c) comprises the steps of prompting, by the server, a user for a sport and inputting, by the user, a selected sport and said step (d) comprises prompting, by the server, a user for the sport data using a prompt specific to the selected sport and inputting, by a user, of sport data into the mobile terminal in communication with the sport server.

4. The method of claim 2, wherein the geographical location of the mobile terminal is received, by said sport server, from the public cellular communications network.

5. The method of claim 1, wherein said step of adapting the sport data comprises determining a type of output device to be transmitted to and thereby determining display and communication parameters for the output device and transmitting sports data in accordance with the determined display and communications parameters.

6. The method of claim 1, wherein said step (c) comprises the steps of prompting, by the server, a user for a sport and inputting, by the user, a selected sport and said step (d)

comprises prompting, by the server, a user for the sport data using a prompt specific to the selected sport, and inputting, by a user, of sport data into the mobile terminal in communication with the sport server.

7. The method of claim 1, further comprising the step of identifying, by the sport server, a type of the mobile terminal that is in communication with the sport server in said step (a) and said step (b) comprises determining display and communication parameters for the mobile terminal.

8. The method of claim 7, wherein said steps step of selecting a prompt display comprises transmitting a prompt to a display of the mobile terminal using the determined display and communications parameters.

9. The method of claim 8, wherein the sports database includes a plurality of fields and said method further comprises the step of determining a field in the sport database in which to store the sport data based on the selected sport and the sport data input by the user in said step (d).

10. The method of claim 1, wherein said sport database includes a plurality of fields and said method further comprises the step of determining a field in the sport database in which to store the sport data based on the selected sport and the sport data input by the user in said step (d).

11. The method of claim 1, further comprising the step of querying the sports server for specific data from all data in the sports database using the mobile terminal connected to the sports server using the public mobile communications network.

12. The method of claim 1, wherein said step (d) of inputting the sport data comprises automatically adding the sport data using a detecting system.

13. The method of claim 1, wherein the display parameters determined in said step (b) comprise at least one of a horizontal resolution, a vertical resolution, and colors of a display of the mobile terminal.

14. The method of claim 1, wherein the display parameters determined in said step (b) comprise at least one of an operating system used by the display, an operating system used by the mobile terminal, a connection speed of the mobile terminal, a processor power of the mobile terminal, an amount of memory of the mobile terminal, and a key for accessing the sport database.

15. The method of claim 1, wherein said step of adapting the sport data comprises allowing only a portion of the output data to pass through said filter adapting device based on the desired format.

16. A system for managing sports data related to statistics for one or more sports, comprising:
a sport database for storing sports data;
a sport server connected to a public cellular communications network and comprising a processor operatively connected to said sport database for managing the sports data;
an input device arranged for receiving an input of sports data and directly transmitting the sports data to said sport server using said public cellular communications network as said sports data is input to said input device, said sports server operatively arranged for receiving the sports data from said input device and for managing queries to said sport database from said input device;
a user database connected to said sport server for storing user data for each user having authority for inputting the sports data;
a connection database connected to said sport server for storing connection data for a plurality of different types of input devices for inputting the sports data;

means for determining a type of input device in communication with said sport server and for determining display and communication parameters of the input device; and
means for transmitting prompts to the input device and receiving replies to said prompts using the determined display and communication parameters for determining the sports data received from the input device; and
means for transmitting the sport data from the sport server to an output device which has requested the sport data, said means for transmitting comprising a filter adapting device including means for adapting the sport data to a desired format for the output device.

17. The system of claim 16, wherein said filter adapting device includes means for determining display and communications parameters of the output device and means for transmitting the sports data to the output device using the determined display and communications parameters.

18. The system of claim 17, wherein said filter adapting device includes means for allowing only a portion of the output data to pass through a filter device based on the desired format.

19. The system of claim 16, wherein said sport database comprises a first sport database for storing sport data related to a first sport and a second sport database for storing sport data related to a second sport.

20. The system of claim 16, said sport database comprising a plurality of fields, wherein said sports server comprises means for selecting a selected field of said plural fields in which to store the sports data in response to the replies to said prompt.

21. The system of claim 20, wherein said sports server comprises means for determining a geographical location of the mobile terminal.

22. The system of claim 21, wherein said means for selecting a selected field comprises means for selecting a selected field of said plural fields in said sport database in which to store the sports data in response to the replies to said prompts and in response to the geographical location of the mobile terminal.

23. The system of claim 21, wherein said sport server comprises means for receiving the geographical location of the mobile terminal from the public cellular communications network.

24. The system of claim 16, further comprising means for user selection of a selected sport to which the sport data applies, wherein said means for transmitting prompts to the input device comprises means for transmitting prompts in response to the selected sport.

25. The system of claim 24, wherein said sport database comprises a plurality of fields and said sport server comprises means for selecting a selected field of said plural fields in said sport database to store the sports data in response to the selected sport.

26. The system of claim 16, wherein the input devices to which said sports server is operatively connectable comprise personal digital assistants, mobile phones, pagers, two-way radios, smart phones, and sport specific input devices.

27. The system of claim 16, wherein said sport server comprises means for outputting said sports data to output devices comprising www-browsers, digital scoreboards, news wires, television broadcasts, personal digital assistants, smart phones, and cell phones in accordance with said determined display and communications parameters.

28. The system of claim 16, further comprising means for querying the sports server for specific data from all data in said sports database using an output device connected to said sports server using the public mobile communications network.

29. The system of claim 16, wherein said input device is operatively arranged for automatically receiving said sport data from a detecting system which detects the sport data to be input.

30. The system of claim 16, wherein the display and communication parameters of the input device comprise at least one of a horizontal resolution, a vertical resolution, and colors of a display of the mobile terminal.

31. The system of claim 30, wherein the display and communication parameters of the input device comprise at least one of an operating system used by the display, an operating system used by the mobile terminal, a connection speed of the mobile terminal, a processor power of the mobile terminal, an amount of memory of the mobile terminal, and a key for accessing the sport database.

32. A mobile terminal for transmitting sports data to a sports database of a sports server connected to a communication network, said mobile terminal comprising:
   a display;
   means for initiating a communication connection with the sports server using a public cellular communications network and indicating to the sports server at least display parameters of said display of the mobile terminal, thereby ensuring that a prompt received from the sports server is suitable for viewing on said display;
   means for setting the mobile terminal in a sports data input mode in response to receiving a prompt from the sports server;
   means for receiving a selection of a selected sport to which the sports data to be inputted pertains; and
   means for receiving sport data at the mobile terminal and directly transmitting the sport data from the mobile terminal to the sports server using the public cellular communications network as the sports data is received by the mobile terminal.

33. The mobile terminal of claim 32, wherein said means for receiving a selection of a selected sport comprises means for prompting the user to select the selected sport for which data is to be entered.

34. The mobile terminal of claim 33, wherein said means for prompting comprises means for displaying, on said display, a list of sports for which data may be entered.

35. The mobile terminal of claim 33, further comprising means for prompting the user for sport specific data to be input for the selected sport.

36. The mobile terminal of claim 35, wherein said means for prompting the user for sport specific data comprises means for displaying, on said display, fields of sport specific data to be input for the selected sport.

37. The mobile terminal of claim 32, further comprising means for prompting the user for sport specific data to be input for the selected sport.

38. The mobile terminal of claim 32, further comprising means for querying the sports server using the public mobile communications network and displaying data received from the sports server.

39. The mobile terminal of claim 32, wherein said mobile terminal comprises one of a personal digital assistant, a mobile phone, a pager, a two-way radio, a smart-phone, and sports database specific input devices.

40. The mobile terminal of claim 32, wherein said input device is operatively arranged for automatically receiving said sport data from a detecting system which detects the sport data to be input.

41. The mobile terminal of claim 32, wherein the display parameters indicated to the sports server comprise at least one of a horizontal resolution, a vertical resolution, and colors of said display of the mobile terminal.

42. The mobile terminal of claim 32, wherein the display parameters indicated to the sports server comprise at least one of an operating system used by the display, an operating system used by the mobile terminal, a connection speed of the mobile terminal, a processor power of the mobile terminal, an amount of memory of the mobile terminal, and a key for accessing the sport database.

* * * * *